United States Patent Office 2,999,855
Patented Sept. 12, 1961

2,999,855
PROCESS OF VULCANIZING CHLOROPRENE POLYMERS
Ralph E. Miegel, Wilmington, Del., assignor to E. I. du Pont de Nemours and Company, Wilmington, Del., a corporation of Delaware
No Drawing. Filed July 17, 1959, Ser. No. 827,732
9 Claims. (Cl. 260—79.5)

This invention is directed to an improvement in the process of vulcanizing polychloroprene, commercially known as neoprene. According to this invention, neoprene is vulcanized using accelerators which are active at ordinary vulcanization temperatures but which provide a much wider margin of processing safety than do the currently used accelerators.

Neoprene is a generic name which is applied to polymers of 2-chloro-1,3-butadiene (chloroprene) and interpolymers of chloroprene with dienes or vinyl compounds such as acrylonitrile, 1,3-butadiene, isoprene, 2,3-dichloro-1,3-butadiene, and styrene in which interpolymers chloroprene comprises the predominant monomer (50% or more by weight). These polymers and interpolymers are usually made in aqueous emulsions and are available on the market today as solid polymers under names such as "Neoprene type GN," "Neoprene type GRT," "Neoprene type W," "Neoprene type AC," "Neoprene type WHV," "Neoprene type WX," and "Neoprene type WRT," as fluid polymers such as "Neoprene type FB" and as latices under type numbers such as type 571, type 750, and type 842A, all of which are generally referred to as polychloroprenes or chloroprene polymers.

Polychloroprenes differ greatly from other synthetic rubbers and from natural rubber in the manner in which they can be vulcanized. With most types of polychloroprene, good vulcanizates may be obtained by incorporating certain metal oxides, such as zinc oxide and magnesia, in the plastic polymer and heating to effect vulcanization. However, it is customary to use, in conjunction with the metal oxides, certain organic accelerators which increase the rate of cure and improve the properties of the vulcanizates. With some types of polychloroprene, such as those which are made in the presence of aliphatic mercaptans, metal oxides act slowly and do not produce a high state of cure even after long periods of heating. With polychloroprenes of this type, accelerators are necessary for a good cure.

Among the polychloroprene accelerators in current use are 2-mercapto-2-imidazoline, and the di-o-tolylguanidine salt of dicatechol borate. These accelerators produce excellent polychloroprene vulcanizates. However, because of their activity at relatively low temperatures, care must be taken to prevent premature vulcanization (scorching) during the processing. This problem of scorch is most noticeable in the case of polychloroprenes which are made in the presence of aliphatic mercaptans.

It is an object of this invention to provide improved accelerators for neoprene which are active at ordinary vulcanization temperatures but which give a wide margin of processing safety. It is a further object of this invention to provide accelerators for chloroprene polymers which enable one to obtain significantly good vulcanizates of polychloroprene free of premature scorching during the processing of said polychloroprene. These and other objects will become apparent in the following description and claims.

More specifically, the present invention is directed to a process of vulcanizing chloroprene polymers which process comprises incorporating in chloroprene polymer at least 0.5 part of magnesia, at least 2 parts of zinc oxide, and from 0.3–5.0 parts by weight per 100 parts of the polymer of a compound of the formula

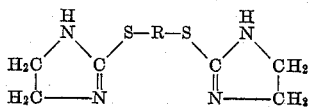

wherein R is —CH$_2$CH$_2$— or

—CH$_2$—CH=CH—CH$_2$— and heating to effect curing of the polymer.

The chloroprene polymers which can be cured by the improved process of the subject invention include homopolymers of chloroprene and interpolymers containing at least 50 weight percent chloroprene and at least one other monomer. Representative examples of suitable monomers are described in U.S. Patents 2,029,410; 2,066,329; 2,066,330 and 2,066,331.

The accelerators of this invention may be used in amounts ranging from 0.3 to 5.0 parts by weight per 100 parts of polymer. Amounts lower than 0.3 part give unsatisfactory cures and there would be no advantage in using more than 5.0 parts. The preferred amounts are 0.5 to 1.5 parts.

Magnesia and zinc oxide are both present as curing agents. The magnesia concentration ranges from about 0.5 to 15 parts by weight per 100 parts of polymer; 4 parts are preferred. The zinc oxide concentration ranges from about 2 to 15 parts by weight per 100 parts of polymer; 5 parts are preferred.

Sulfur or any of the antioxidants (such as phenyl-beta-naphthylamine, phenyl-alpha-naphthylamine, or 2,2'-methylenebis(4-methyl-6-tertiary-butylphenol), coloring matters, and other types of compounding ingredients commonly used in fabricating polychloroprene articles may be incorporated prior to cure.

The vulcanization may be carried out from 125° C. to 200° C. The preferred range is 140° C. to 175° C. Vulcanization may be carried out in molds under pressure, or the shaped articles may be heated with steam or hot air or treated in a hot liquid bath. These accelerators may also be used in latex or cements.

The compounds of this invention may be prepared by the reaction of ethylenethiourea(2-mercapto-2-imidazoline) with 1,4-dichloro-2-butene or ethylene dibromide.

Representative examples illustrating the present invention are as follows.

*Example A.—Preparation of 2,2'-(2-butenylenedithio)di-2-imidazoline*

A suspension of 500 g. (4.9 moles) of ethylenethiourea in 3.5 liters of water was heated at 65–75° C., with agitation, with 305 g. (2.44 moles) of 1,4-dichloro-2-butene until the solid and oil were taken up in the aqueous phase. The solution was cooled below room temperature and treated with 200 g. (5 moles) of sodium hydroxide pellets in 2.35 liters of water. The product was collected on a filter, washed with water and ethyl alcohol, in turn, and dried at 40° C. under reduced pressure.

The compound showed the following analysis: Calculated for C$_{10}$H$_{16}$N$_4$S$_2$: C, 46.9; H, 6.25; N, 21.9; S, 25.0. Found: C, 47.1; H, 6.4; N, 21.7; S, 24.8.

Example B. — Preparation of 2,2'-ethylenedithiodi-2-imidazoline 2,2'-ethylenedithiodi-2-imidazoline was prepared from ethylenethiourea (2 moles) and ethylene dibromide (1 mole) in a manner similar to that used for 2,2'-(2-butenylenedithio)di-2-imidazoline, as described in Example A.

Example 1

Polychloroprene was compounded according to the following formula to yield a non-black stock:

| | Parts |
|---|---|
| Polychloroprene[1] | 100 |
| 2,2'-methylenebis(6-tert-butyl-p-cresol) | 2 |
| Magnesia | 4 |
| Crown clay | 90 |
| Processing oil | 12 |
| Zinc oxide | 5 |
| Accelerator, as shown in Table I. | |

[1] Polychloroprene prepared by the emulsion polymerization of chloroprene in the presence of an aliphatic mercaptan as a modifier as described in U.S. Patent 2,494,087.

The compound stock was cured in a mold in a press at 153° C. for 15 minutes. The cured product was tested according to A.S.T.M. standard D412–51T. The Mooney scorch data were obtained according to A.S.T.M. standard D1077–55T.

Table I shows the test results and gives a comparison of 2,2'-(2-butenylenedithio)di-2-imidazoline with 2-mercapto-2-imidazoline.

TABLE I

| | 2-mercapto-2-imidazoline, parts | | 2,2'-(2-butenylenedithio)di-2-imidazoline, parts | | | |
|---|---|---|---|---|---|---|
| | 0.5 | 1.0 | 0.50 | 0.64 | 0.80 | 2.0 |
| Modulus at 500% elongation, p.s.i. | 1,550 | 1,575 | 1,230 | 1,200 | 1,300 | 1,450 |
| Tensile strength at break in p.s.i. | 2,350 | 2,050 | 1,720 | 1,720 | 2,100 | 2,260 |
| Elongation at break, percent | 795 | 680 | 710 | 740 | 760 | 700 |
| Mooney scorch min. for 10-point rise above minimum value (121° C.) | 22 | 10 | 39 | 36 | 32 | 22 |
| Minimum reading | 22 | 16 | 23 | 22 | 22 | 22 |

Example 2

The polychloroprene of Example 1 was compounded according to the following formula to yield a black stock:

| | Parts |
|---|---|
| Polychloroprene | 100 |
| Phenyl-beta-naphthylamine | 1 |
| Magnesia | 4 |
| Stearic acid | 0.5 |
| Semi-reinforcing furnace carbon black | 29 |
| Zinc oxide | 5 |
| Accelerator, as shown in Table II. | |

The compounded stock was cured in a mold in a press for 30 minutes at 153° C. Table II shows the results of the tests.

TABLE II

| | 2-mercapto-2-imidazoline, 0.5 part | 2,2'-(2-butenylenedithio)-di-2-imidazoline, parts | | | |
|---|---|---|---|---|---|
| | | 0.64 | 0.80 | 0.90 | 0.96 |
| Modulus at 300% elongation, p.s.i. | 1,875 | 1,425 | 1,600 | 1,540 | 1,825 |
| Tensile strength at break, p.s.i. | 3,150 | 3,400 | 3,100 | 3,370 | 3,550 |
| Elongation at break, percent | 430 | 540 | 490 | 500 | 480 |
| Mooney scorch min. for 10-point rise above minimum value (121° C.) | 15 | 33 | 28 | 28 | 33 |
| Minimum reading | 27 | 28 | 27 | 28 | 27 |

Example 3

The polychloroprene of Example 1 was compounded according to the formula of Example 2. 2,2'-ethylenedithiodi-2-imidazoline was used in the proportions shown in Table III. The compounded stock was cured in a mold in a press at 153° C. for 30 minutes. Table III shows the results of the tests.

TABLE III

| | 2,2'-ethylenedithiodi-2-imidazoline, parts | |
|---|---|---|
| | 0.7 | 1.1 |
| Modulus at 300% elongation, p.s.i. | 1,400 | 1,725 |
| Tensile strength at break, p.s.i. | 3,350 | 3,500 |
| Elongation at break, percent | 570 | 500 |
| Mooney scorch minutes for 10-point rise above minimum value (121° C.) | 43 | 43 |
| Minimum reading | 20 | 20 |

The heretofore described polymers of chloroprene (2-chloro-1,3-butadiene) and interpolymers of chloroprene with dienes or vinyl compounds in which interpolymers the chloroprene comprises the predominant monomer may be substituted in any of the preceding specific representative examples to give substantially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process of vulcanizing chloroprene polymers wherein zinc oxide, magnesia and from 0.3 to 5.0 parts by weight per 100 parts of the polymer of the compound having the formula

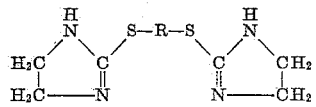

wherein R is taken from the group consisting of —CH$_2$CH$_2$— and —CH$_2$—CH=CH—CH$_2$—, are incorporated into said chloroprene polymer followed by heating to effect curing of said chloroprene polymer.

2. The process of claim 1 carried out at a temperature within the range of 125° C. to 200° C.

3. The process of claim 1 wherein the chloroprene polymer is polychloroprene.

4. A process of vulcanizing chloroprene polymers wherein zinc oxide, magnesia and from 0.3 to 5.0 parts by weight per 100 parts of the polymer of the compound having the formula

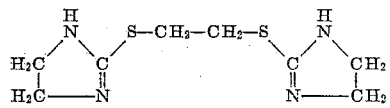

are incorporated into said chloroprene polymer followed by heating to effect curing of said chloroprene polymer.

5. The process of claim 4 carried out at a temperature within the range of 125° C. to 200° C.

6. The process of claim 4 wherein the chloroprene polymer is polychloroprene.

7. A process of vulcanizing chloroprene polymers wherein zinc oxide, magnesia and from 0.3 to 5.0 by weight per 100 parts of the polymer of the compound having the formula

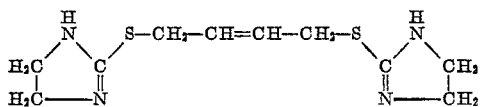

are incorporated into said chloroprene polymer followed by heating to effect curing of said chloroprene polymer.

8. The process of claim 7 carried out at a temperature within the range of 125° C. to 200° C.

9. The process of claim 7 wherein the chloroprene polymer is polychloroprene.

References Cited in the file of this patent
UNITED STATES PATENTS 2,544,746     Baum _____ Mar. 13, 1951